United States Patent
Kodama et al.

(10) Patent No.: US 11,387,017 B2
(45) Date of Patent: Jul. 12, 2022

(54) METHOD OF PRODUCING SUPERCONDUCTOR

(71) Applicant: HITACHI, LTD., Tokyo (JP)

(72) Inventors: Motomune Kodama, Tokyo (JP); Hideki Tanaka, Tokyo (JP); Takaaki Suzuki, Tokyo (JP); Junichi Shimoyama, Sagamihara (JP)

(73) Assignee: HITACHI, LTD., Tokyo (JP)

(*) Notice: Subject to any disclaimer, the term of this patent is extended or adjusted under 35 U.S.C. 154(b) by 591 days.

(21) Appl. No.: 16/479,274

(22) PCT Filed: Feb. 26, 2018

(86) PCT No.: PCT/JP2018/006876
§ 371 (c)(1),
(2) Date: Jul. 19, 2019

(87) PCT Pub. No.: WO2018/159513
PCT Pub. Date: Sep. 7, 2018

(65) Prior Publication Data
US 2019/0385766 A1 Dec. 19, 2019

(30) Foreign Application Priority Data
Mar. 3, 2017 (JP) .............................. JP2017-039956

(51) Int. Cl.
C01B 35/04 (2006.01)
H01B 12/02 (2006.01)

(52) U.S. Cl.
CPC ............. H01B 12/02 (2013.01); C01B 35/04 (2013.01)

(58) Field of Classification Search
CPC . C01F 5/00; C01B 35/00; C01B 35/02; C01B 35/023; Y10S 336/01
See application file for complete search history.

(56) References Cited

U.S. PATENT DOCUMENTS

| | | | |
|---|---|---|---|
| 7,838,465 B2 * | 11/2010 | Dou | B82Y 30/00 420/901 |
| 2005/0245400 A1 | 11/2005 | Dou et al. | |
| 2008/0274902 A1 | 11/2008 | Yamada et al. | |
| 2009/0005251 A1 * | 1/2009 | Fluekiger | H01L 39/141 505/231 |
| 2013/0012395 A1 * | 1/2013 | Tanaka | H01L 39/2487 505/430 |
| 2016/0314877 A1 | 10/2016 | Kumakura et al. | |
| 2017/0263932 A1 | 9/2017 | Kumakura et al. | |

FOREIGN PATENT DOCUMENTS

| | | | |
|---|---|---|---|
| CN | 1986407 | * | 6/2006 |
| CN | 101508571 | * | 8/2009 |
| JP | 2003-146759 A | | 5/2003 |
| JP | 2004-296156 A | | 10/2004 |
| JP | 2005-529832 A | | 10/2005 |
| JP | 2008-091325 A | | 4/2008 |
| JP | 2008-235263 A | | 10/2008 |
| WO | 2015/093475 A1 | | 6/2015 |
| WO | 2016/021483 A1 | | 2/2016 |

OTHER PUBLICATIONS

Translation of CN 101508571 (Year: 2009).*
Translation of CN 1986407 (Year: 2006).*
M. A. Susner, et al., "Homogeneous carbon doping of magnesium diboride by high-temperature, high-pressure synthesis", Applied Physics Letter (AIP) 104, 2014.
International Search Report of PCT/JP2018/006876 dated Apr. 10, 2018.

* cited by examiner

Primary Examiner — Robert C Boyle
(74) Attorney, Agent, or Firm — Mattingly & Malur, PC

(57) ABSTRACT

The following two problems arise when carbon is added to a starting material powder in the process of production of an $MgB_2$ superconductor: (1) an impurity phase increases; and (2) the degree of substitution of carbon at boron sites is spatially non-uniform. This superconductor production method comprises: a mixing step of mixing a starting material powder and an additive; and a heat treatment step of heat-treating the mixture prepared in the mixing step. The starting material powder is $MgB_2$ powder or a mixed powder of magnesium and boron, and the additive is an Mg—B—C compound containing three elements of magnesium, boron and carbon.

6 Claims, 4 Drawing Sheets

[Fig. 1]
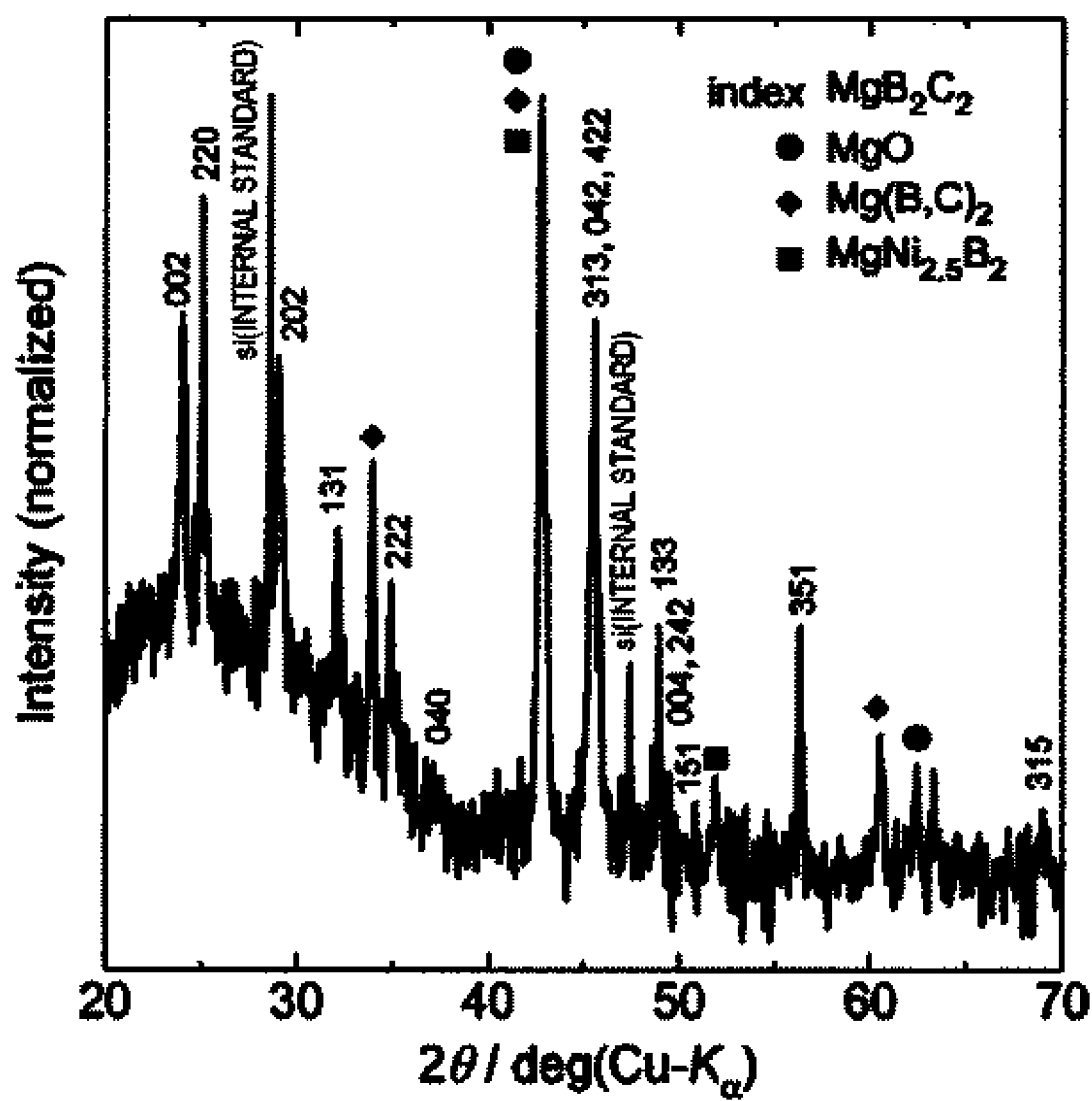

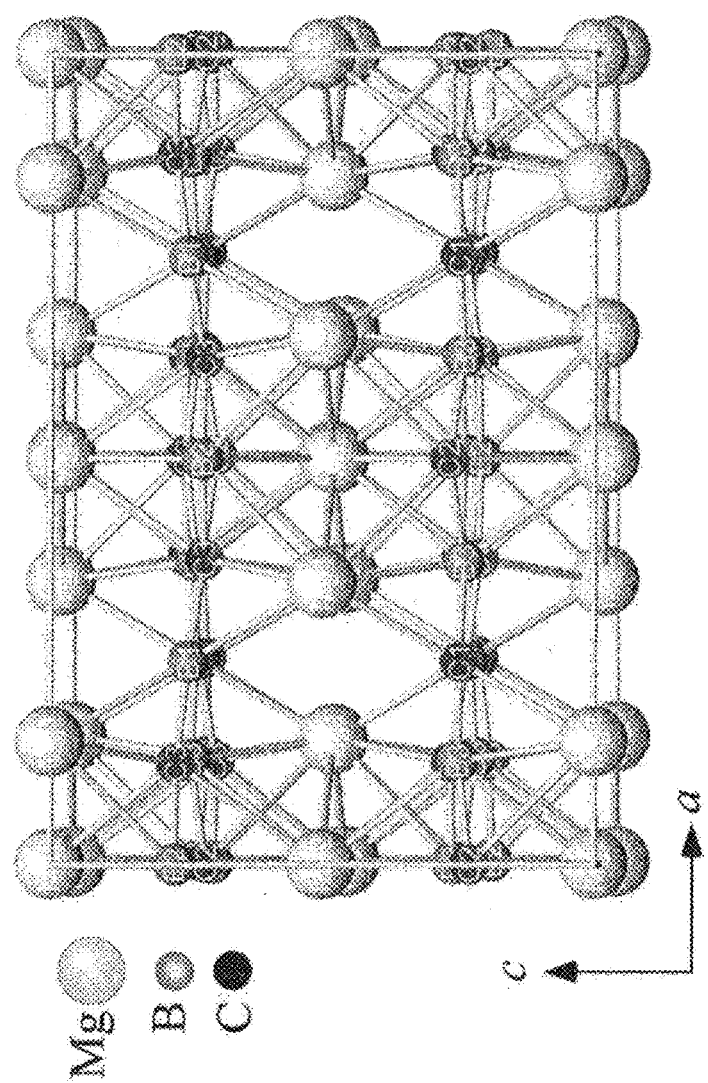
[Fig. 2]

[Fig. 3]
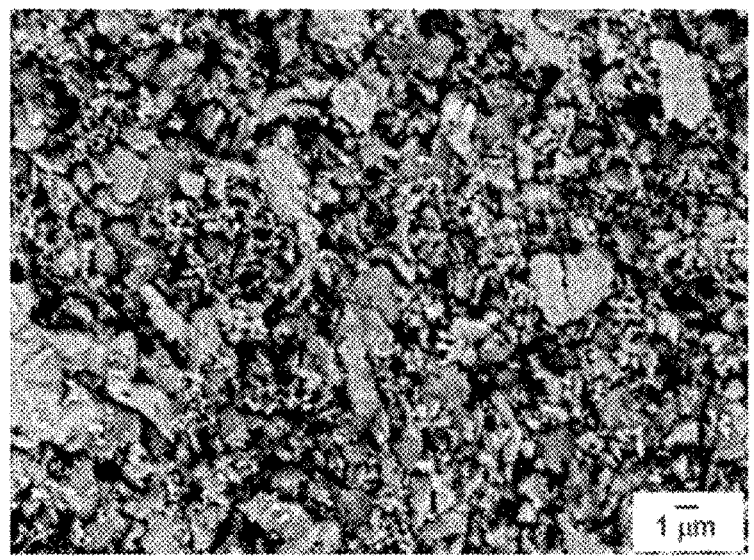
[Fig. 4]
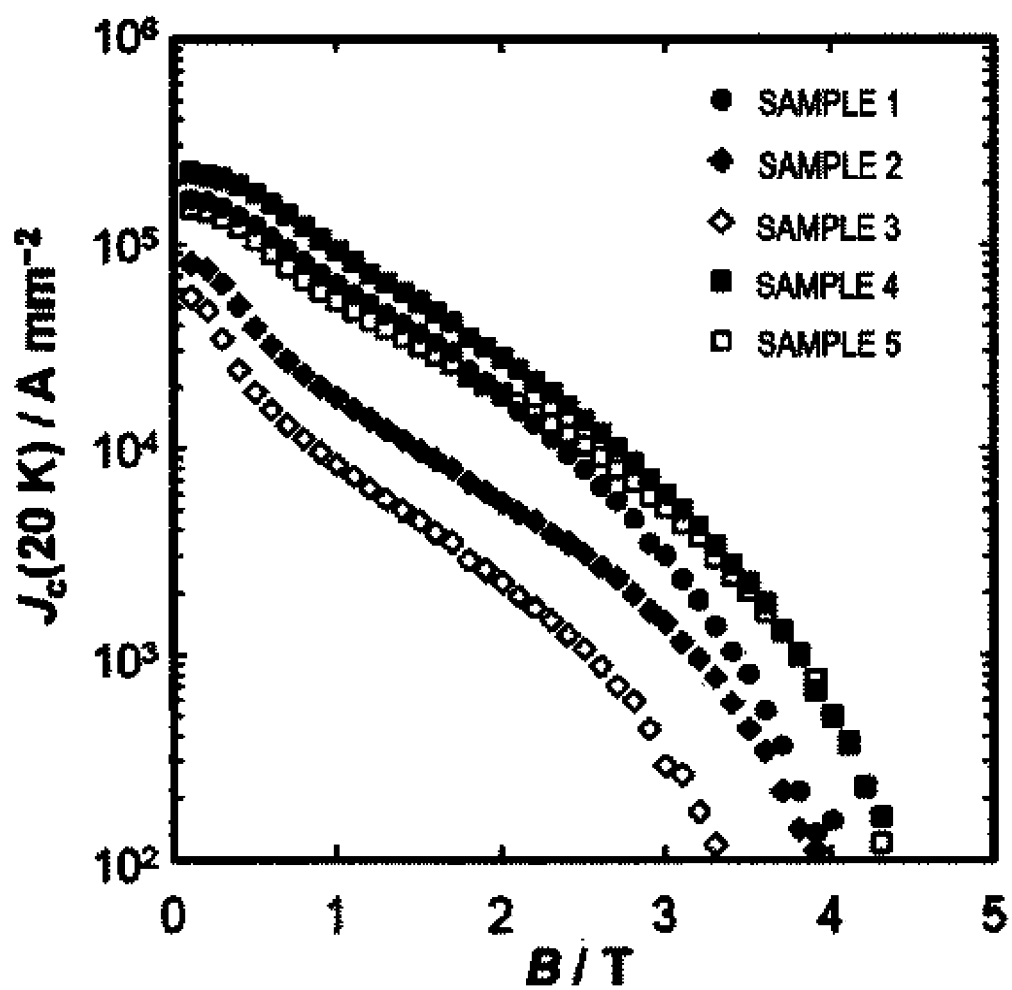

[Fig. 5]
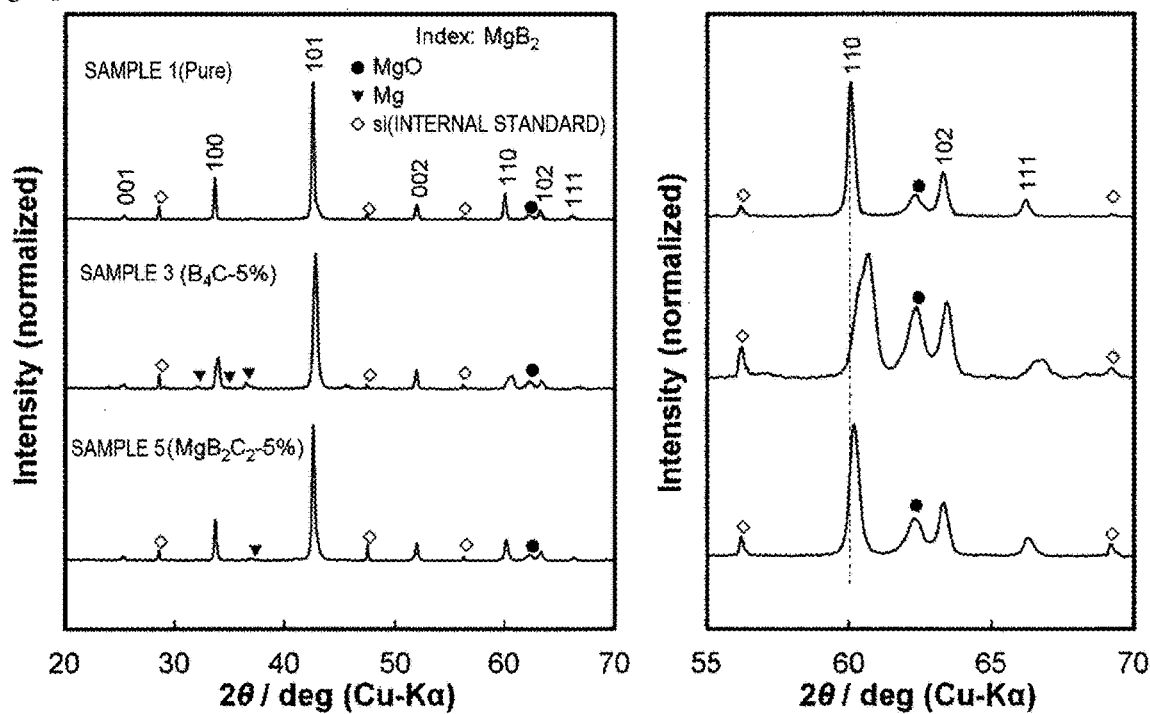
[Fig. 6]
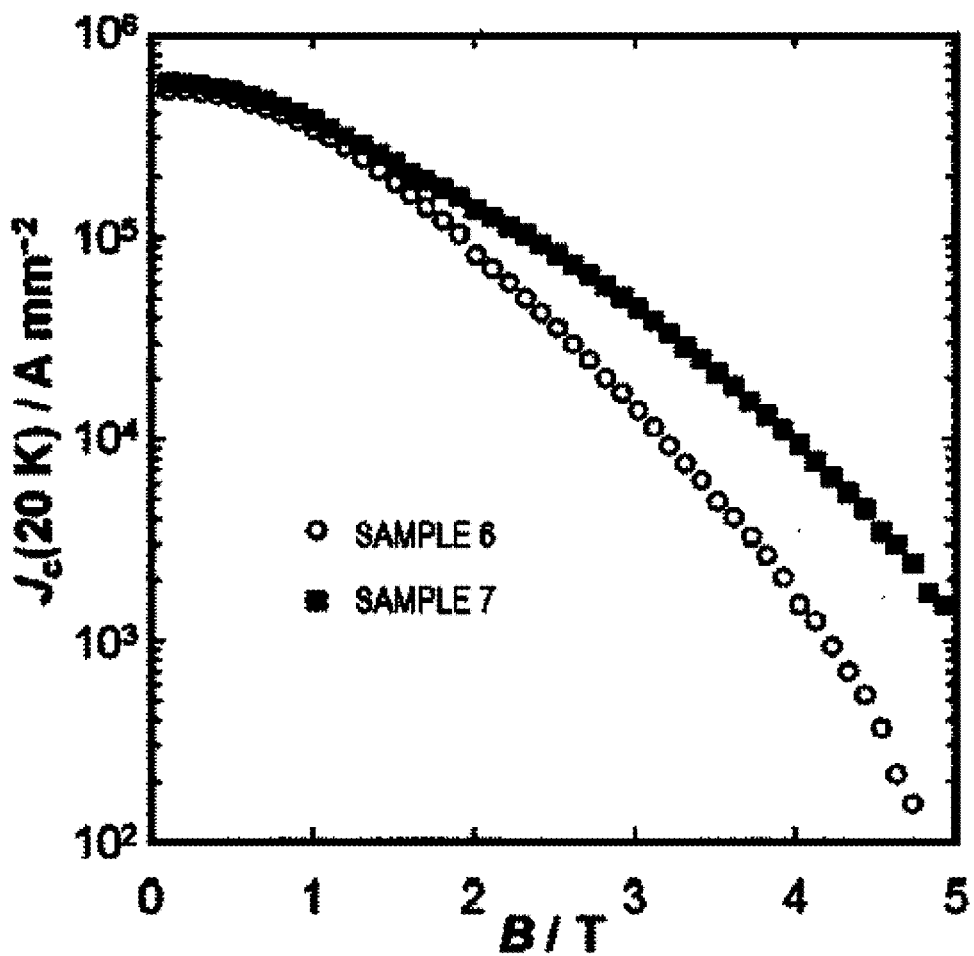

METHOD OF PRODUCING SUPERCONDUCTOR

TECHNICAL FIELD

The present invention relates to a method of producing an $MgB_2$ superconductor excellent in critical current density.

BACKGROUND ART $MgB_2$, which is a metallic superconductor having the highest critical temperature of about 40 K and which can be synthesized at a relatively low cost, is expected to be applied to superconducting wire rods and superconducting magnets. In particular, Nb—Ti, which is currently the most popular superconducting material, has a low critical temperature of 9 K and thus is used mainly after cooling with liquid helium which is expensive and unstable in supply, whereas $MgB_2$ does not require the use of liquid helium and is assumed to be cooled by conduction cooling with a freezing machine or cooled with liquid hydrogen. In particular, in view of the cost of conduction cooling and the boiling point of liquid hydrogen, $MgB_2$ is preferably used at a temperature of about 20 K. A general method of producing superconducting wire rods is the powder-in-tube (PIT) method. In the PIT method, powder as a starting material is charged in a metal tube and elongated into a wire by a drawing process or other process to thereby produce a superconducting wire rod.

When a superconducting wire rod is used, a higher critical current density is preferred. The critical current density is the upper limit of the current density at which electricity is conducted with zero electrical resistance. The critical current density is determined by a flux pinning phenomenon. In the case of $MgB_2$, a grain boundary is considered to be a main flux pinning canter. For increasing the flux pinning force by grain boundaries, it is effective to increase the number of grain boundaries (to reduce the crystal grain size) to increase the pin concentration, or to introduce lattice defects in the crystal grains to increase the elementary pinning force. For achieving them, various measures are given to prevent coarsening of crystal grains and restoration of lattice strain, in synthesis of $MgB_2$ by the PIT method.

Addition of a carbon containing material is a known measure for increasing the critical current density of $MgB_2$. The added carbon atoms substitute a part of the boron sites in a crystal of $MgB_2$ to change the electronic state, introducing lattice defects. As a result, the critical temperature $T_c$ is decreased, the anisotropy of the upper critical magnetic field $B_{c2}$ is decreased, $B_{c2}$ at the absolute zero is increased, and the mean free path of electrons is reduced, resulting in increase of the elementary pinning force. These factors are entangled and in many cases, $J_c$ in a high magnetic field region is drastically increased at a temperature that is sufficiently lower than $T_c$.

When a carbon containing material is added, any increase of impurity phase due to the addition preferably does not occur. In addition, since excessive carbon substitution causes significant decrease of $T_c$, leading to decrease of $J_c$, a practically effective carbon substitution ratio is in the range of 1 to 5% of the boron sites. It is important to select a material that efficiently causes carbon substitution in this range.

It has been pointed out that when SiC is used as an additive material, an $Mg_2Si$ phase generated as a by-product interrupts the supercurrent, inhibiting the uniformity in the longitudinal direction of a superconducting wire rod. It is also pointed out that when $B_4C$ is used as an additive material, a high temperature and high pressure treatment is required to achieve an actual carbon substitution ratio that is spatially uniform (NPL 1).

CITATION LIST

Non-patent Literature

NPL 1: M. A. Susner et al. Appl. Phys. Lett. 104, 162603 (2014)

SUMMARY OF INVENTION

Technical Problem

When carbon is added to a raw material powder in a process of producing an $MgB_2$ superconductor, there arise the following two problems: (1) the impurity phase increases; and (2) the carbon substitution ratio in the boron sites is spatially non-uniform.

Solution to Problem

The method of producing a superconductor according to the present invention includes: a mixing step in which a raw material powder and an additive are mixed to produce a mixture; and a heat treatment step in which the mixture is subjected to a heat treatment, the raw material powder being an $MgB_2$ powder or a mixed powder of magnesium and boron, the additive being an Mg—B—C compound containing three elements of magnesium, boron, and carbon.

Advantageous Effects of Invention

An $MgB_2$ superconductor produced by the present invention has a small amount of impurity phase, has an actual carbon substitution ratio that is spatially uniform, and has a high critical current density.

BRIEF DESCRIPTION OF DRAWINGS

FIG. 1 shows an X-ray powder diffraction profile of synthesized $MgB_2C_2$.

FIG. 2 illustrates a crystal structure of $MgB_2C_2$.

FIG. 3 shows an SEM image of the appearance of a synthesized $MgB_2C_2$ powder.

FIG. 4 shows dependency of critical current density on magnetic field in each of an additive-free, a $B_4C$-added, and an $MgB_2C_2$-added $MgB_2$ superconducting bulk sample.

FIG. 5 shows X-ray powder diffraction profiles in an additive-free, a $B_4C$-added, and an $MgB_2C_2$-added $MgB_2$ superconducting bulk sample.

FIG. 6 shows dependency of critical current density on magnetic field in each of an additive-free and an $MgB_{1.88}C_{0.12}$-added $MgB_2$ superconducting bulk sample.

DESCRIPTION OF EMBODIMENTS

The method of producing an $MgB_2$ superconductor according to this embodiment includes: a mixing step in which a raw material powder and an additive are mixed to produce a mixture; and a heat treatment step in which the mixture is subjected to a heat treatment. As the additive agent, an Mg—B—C compound containing at least three elements of magnesium, boron, and carbon is used. Examples of such Mg—B—C compounds include $MgB_2C_2$ and $MgB_2$ in which the B sites are excessively substituted with carbon. In an example of a process of synthesizing $MgB_2$ through addition of an Mg—B—C compound, an Mg powder, a B powder, and an Mg—B—C compound powder are mixed, compressed, and then subjected to a heat treatment. In another example of such a process, an $MgB_2$ powder and an Mg—B—C compound powder are mixed, compressed, and then subjected to a heat treatment. Such an Mg—B—C compound can be synthesized by mixing a magnesium powder, a boron powder, and a carbon powder, and then subjecting the mixture to a heat treatment at about 1000° C. Another carbon containing material may be added in addition to the Mg—B—C compound.

The method of producing an $MgB_2$ superconductor may include, prior to the heat treatment step, any one of a compression step in which the mixture is compressed and a wire elongation processing step in which the mixture is charged in a metal tube and is subjected to a wire elongation processing.

Embodiments of the present invention will be described below with reference to drawings. Note that a superconductor includes both of a superconducting wire rod and a superconducting bulk.

EXAMPLE 1

<Synthesis of $MgB_2C_2$ powder>

$MgB_2C_2$ powder is not commercially available as far as the inventors know. Thus, synthesis of $MgB_2C_2$ powder was tried. A magnesium powder (99.8%, 200 mesh), a boron powder (99%, 0.8 μm), and a carbon powder were weighed in a molar ratio of 1:2:2, and were mixed in a mortar. The mixture was charged in a metal tube (SUS316), and the metal tube, after crushing both the ends thereof, was further put and sealed in a quartz tube, which was then subjected to a heat treatment at 1000° C. for 18 hours. The powder was then taken out of the metal tube. By the above procedure, an $MgB_2C_2$ powder was synthesized.

FIG. 1 shows an X-ray diffraction profile of the synthesized powder. It was found that the main phase of the synthesized powder was $MgB_2C_2$. FIG. 2 illustrates a crystal structure of the powder. FIG. 3 shows a scanning electron microscope image of the $MgB_2C_2$ powder. The particle size of the powder was about 1 μm.

EXAMPLE 2

$MgB_2$ in which the $MgB_2C_2$ powder was added to raw material powders was synthesized, and the generated phase and the critical current density thereof were evaluated. For comparison, additive-free $MgB_2$ and $B_4C$-added $MgB_2$ were synthesized and evaluated.

As starting materials, a magnesium powder (200 mesh, 99.8%), a boron powder (0.8 μm, 95%), an $MgB_2C_2$ powder (produced in Example 1), and a $B_4C$ powder (99%, 50 nm) were used. Table 1 shows the mixing ratio by mole of the starting materials for each sample.

TABLE 1

| Sample name | Mg | B | $B_4C$ | $MgB_2C_2$ | Mg:B:C | Remarks |
|---|---|---|---|---|---|---|
| Sample 1 | 1 | 2 | 0 | 0 | 1:2:0 | Comparative Example A |
| Sample 2 | 1 | 1.75 | 0.050 | 0 | 1:1.95:0.05 | Comparative Example B |
| Sample 3 | 1 | 1.50 | 1.100 | 0 | 1:1.90:0.10 | Comparative Example C |

TABLE 1-continued

| Sample name | Mg | B | $B_4C$ | $MgB_2C_2$ | Mg:B:C | Remarks |
|---|---|---|---|---|---|---|
| Sample 4 | 0.975 | 1.90 | 0 | 0.025 | 1:1.95:0.05 | Example A |
| Sample 5 | 0.950 | 1.80 | 0 | 0.050 | 1:1.90:0.10 | Example B |

The starting materials were weighed as shown in Table 1 and were mixed in a mortar. The mixture was charged in a metal tube (SUS316) and the metal tube, after crushing and sealing both the ends thereof, was further put and sealed in a quartz tube, which was then subjected to a heat treatment at 800° C. for 3 hours. An $MgB_2$ sample produced by the heat treatment was taken out of the metal tube. The $MgB_2$ sample was cut into a rectangular parallelepiped shape and the magnetic hysteresis loop at 20 K was acquired with a SQUID flux meter (Quantum Design, MPMS) to derive the critical current density based on the Extended Bean Model. 20 K is the most expected temperature in application of $MgB_2$.

FIG. 4 shows the dependency of the critical current density ($J_c$) on the magnetic field (B) at 20 K. Higher critical current densities than in the additive-free sample 1 were obtained, over the magnetic field range in the $MgB_2C_2$-added sample 4, and in the region of higher magnetic field than 2T in the sample 5. In comparison with respect to the critical current density in the magnetic field of 3 T, the samples 4 and 5 have superior values which are about twice the value of the sample 1. On the other hand, in the $B_4C$-added samples 2 and 3, no higher critical current density than in the additive-free sample 1 was achieved at 20 K. At a low temperature such as the liquid helium temperature (4.2 K), a high critical current density is relatively easily achieved whatever carbon-additive material is selected, whereas at a relatively higher temperature such as 20 K, it is difficult to achieve a superior critical current density. The critical current density is even decreased in some cases, for example, the case of $B_4C$ addition. However, an $MgB_2C_2$ powder has an effect of significantly increasing the critical current density at 20 K at which application of $MgB_2$ is expected.

The reason why higher critical current densities were achieved by addition of an $MgB_2C_2$ powder supposedly recites in the following two points:
(1) newly production of the impurity phase is less likely to occur even when the additive is added to raw materials; and
(2) the actual carbon substitution ratio in the boron sites is uniform in a spatial view.

The reasons will be explained using X-ray powder diffraction profiles of samples 1, 3, and 5 in FIG. 5.

For all the samples, $MgB_2$ as a main phase and a small amount of MgO are observed. Note that the peaks of Si are derived from Si powder which was mixed as an internal standard sample and are not intrinsic ones. Accordingly, by the addition of the $MgB_2C_2$ powder, newly introduction of impurity phase into $MgB_2$ does not occur as with the case of $B_4C$ powder.

When carbon substitution in the boron sites occurs, the a-axis length of the $MgB_2$ crystal is reduced and the (110) peak shifts to the higher angle side. In the $MgB_2C_2$-added sample 5, the (110) peak shifts to the higher angle side relative to the peak in the additive-free sample 1, and the peak shape is relatively sharp. On the other hand, the (110) peak in the $B_4C$-added sample 3 has a shape like that of two overlapping peaks. This suggests that the actual carbon substitution ratio is spatially uniform in the case of $MgB_2C_2$ addition whereas that is spatially non-uniform in the case of $B_4C$ addition. Since an excessive actual carbon substitution ratio leads to significant decrease of the critical temperature, resulting in an adverse effect on the critical current density, the actual carbon substitution ratio has to be controlled to a proper value. Thus, as carbon substitution occurs in a more spatially-uniform manner, the actual carbon substitution ratio is more easily controlled to a proper value. From this viewpoint, $MgB_2C_2$ powder is more effective as a carbon additive material as compared with $B_4C$ powder.

The more spatially-uniform occurrence of the carbon substitution in $MgB_2C_2$ powder as compared with that in $B_4C$ powder is attributable to Mg contained in the composition thereof. Mg has a lower melting point, a lower boiling point, and a higher saturated vapor pressure as compared with B and C. For this reason, $MgB_2C_2$ is more unstable and is more liable to decompose as compared with $B_4C$, which supposedly contributes to the uniformity of the spatial distribution of the carbon concentration.

Example 2 uses a process (in-situ method) in which a magnesium powder, a boron powder, and an additive are mixed and the mixture was subjected to a heat treatment. However, a process (ex-situ method) in which an $MgB_2$ powder is previously produced from a magnesium powder and a boron powder, the $MgB_2$ powder is mixed with an additive, and the mixture is subjected to a heat treatment may be used. In general, the former in-situ process provides a higher critical current density, and the latter ex-situ process is more easily produce a uniform wire rod.

EXAMPLE 3

In Example 1, an $MgB_2C_2$ powder was synthesized as a carbon source. In Example 3, $MgB_{2-x}C_x$ (0<x<0.4), which is $MgB_2$ in which a part of the boron sites is substituted with carbon, was synthesized as a carbon source. Here, a synthesis procedure of $MgB_{2-x}C_x$ (0<x<0.4) will be explained as an example thereof.

A magnesium powder (99.8%, 200 mesh), a boron powder (99%, 0.8 μm), and a carbon powder were weighed in a molar ratio of 1:1.88:0.12 and were mixed in a mortar. The mixture was charged in a metal tube (SUS316), and the metal tube, after crushing both the ends thereof, was further put and sealed in a quartz tube, which was then subjected to a heat treatment at 1000° C. for 18 hours. Then the powder was taken out of the metal tube. The main phase of the resulting powder had the same crystal structure as $MgB_2$, and a part of the boron sites thereof was substituted with carbon. The powder is hereinafter referred to as $Mg(B_{1.88}C_{0.12})$ powder.

EXAMPLE 4

$MgB_2$ in which $MgB_{2-x}C_x$ (0<x<0.4) was added as an additive material to raw material powders was synthesized and the critical current density thereof was evaluated. For comparison, additive-free $MgB_2$ was also synthesized and evaluated.

A magnesium powder (200 mesh, 99.8%), a boron powder (0.8 μm, 95%), an $Mg(B_{1.88}C_{0.12})$ powder (produced in Example 3) were used as starting materials. The boron powder and the $Mg(B_{1.88}C_{0.12})$ powder were weighed in a molar ratio shown in Table 2 and were mixed in a mortar. In a metal tube (SUS316) with one end crushed, the magnesium powder was charged, the mixed powder was then charged, and the magnesium powder was charged again, and then the other end was crushed and sealed. The metal tube was put and sealed in a quartz tube, which was then subjected to a heat treatment at 800° C. for 72 hours. By the heat treatment, magnesium at both the ends of the metal tube diffused into the central mixed powder area to produce $MgB_2$. The $MgB_2$ sample was taken out of the metal tube.

TABLE 2

| Sample name | Mg | B | $MgB_{1.88}C_{0.12}$ | B:C | Remarks |
|---|---|---|---|---|---|
| Sample 6 | — | 1 | 0 | 2:0 | Comparative Example D |
| Sample 7 | — | 1 | 0.25 | 1.96:0.04 | Example C |

The $MgB_2$ sample was cut into a rectangular parallelepiped shape, and the magnetic hysteresis loop at 20 K was acquired with a SQUID flux meter (Quantum Design, MPMS) to derive the critical current density based on the Extended Bean Model. FIG. 6 shows the dependency of the critical current density ($J_c$) on the magnetic field (B). In the $MgB_2C_2$-added sample 7, higher critical current densities than in an additive-free sample 6 were observed in a higher magnetic field region.

Here, only the $Mg(B_{1.88}C_{0.12})$ powder was mentioned as an example of $MgB_{2-x}C_x$ (0<x<0.4), but the same result was obtained for the critical current density as long as the condition of x 0<x<0.4 was satisfied.

As observed in Examples mentioned above, an Mg—B—C compound containing three elements of magnesium, boron, and carbon (for example, $MgB_2C_2$ or $MgB_2$ in which a part of the boron sites is substituted) is effective as a carbon additive material in synthesis of $MgB_2$. This substance contains no unnecessary element which may cause an impurity phase, and the carbon substitution in the boron sites of $MgB_2$ occurs in a uniform manner The effectiveness of the addition of an Mg—B—C compound was demonstrated, in an in-situ method in which an $MgB_2$ superconducting bulk is synthesized from a mixed body of magnesium powder and boron powder in Example 2, and in a diffusion method in which an $MgB_2$ superconducting bulk is synthesized by diffusing magnesium in a boron powder area in Example 4. However, the effect of the addition is not limited to in-situ methods and diffusion methods. For example, the addition is effective in ex-situ methods in which an $MgB_2$ superconducting bulk is synthesized by sintering of $MgB_2$ powder, and furthermore, is effective not only for $MgB_2$ superconducting bulks but also for $MgB_2$ superconductors.

In Examples mentioned above, only an Mg—B—C compound was added as a carbon additive material, but an Mg—B—C compound may be added together with a second carbon additive material. Even if an element that may cause an impurity is contained in the second carbon additive material, the co-addition with the Mg—B—C compound enables reduction of the amount of the generated impurity without reduction of the amount of carbon as compared with the case of adding only the second carbon additive material.

The invention claimed is:

1. A method of producing a superconductor, the method comprising:
   a mixing step in which a raw material powder and an additive are mixed to produce a mixture; and
   a heat treatment step in which the mixture is subjected to a heat treatment;
   the raw material powder being an $MgB_2$ powder or a mixed powder of magnesium and boron, the additive being an Mg—B—C compound containing three elements of magnesium, boron, and carbon.

2. The method of producing a superconductor according to claim 1, wherein the Mg—B—C compound is $MgB_2C_2$.

3. The method of producing a superconductor according to claim 1, wherein the Mg—B—C compound is $MgB_{2-x}C_x$ ($0<x<0.4$).

4. The method of producing a superconductor according to claim 1, wherein the method comprises, prior to the heat treatment step, a compression step in which the mixture is compressed.

5. The method of producing a superconductor according to claim 1, wherein the method comprises, prior to the heat treatment step, a wire elongation processing step in which the mixture is charged in a metal tube and is subjected to a wire elongation processing.

6. The method of producing a superconductor according to claim 1, wherein the Mg—B—C compound powder is synthesized by mixing a magnesium powder, a boron powder, and a carbon containing material and subjecting the resulting mixture to a heat treatment.

\* \* \* \* \*